US008483295B2

(12) United States Patent
Tamaki et al.

(10) Patent No.: US 8,483,295 B2
(45) Date of Patent: Jul. 9, 2013

(54) ENCODED SIGNAL ARRANGEMENT METHOD IN MULTI-CARRIER COMMUNICATION AND COMMUNICATION DEVICE

(75) Inventors: Satoshi Tamaki, Kokubunji (JP); Takashi Yano, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 535 days.

(21) Appl. No.: 12/302,508

(22) PCT Filed: Jan. 11, 2007

(86) PCT No.: PCT/JP2007/050231
§ 371 (c)(1),
(2), (4) Date: Sep. 29, 2009

(87) PCT Pub. No.: WO2007/138753
PCT Pub. Date: Dec. 6, 2007

(65) Prior Publication Data
US 2010/0020889 A1 Jan. 28, 2010

(30) Foreign Application Priority Data

May 31, 2006 (JP) .................................. 2006-150876

(51) Int. Cl.
*H04L 27/28* (2006.01)
(52) U.S. Cl.
USPC ........... 375/260; 375/259; 375/295; 375/299; 375/300; 375/302
(58) Field of Classification Search
USPC ................... 375/260, 259, 295, 299, 300, 302
See application file for complete search history.

(56) References Cited

U.S. PATENT DOCUMENTS

| 2005/0135324 | A1* | 6/2005 | Kim et al. | 370/343 |
| 2006/0126491 | A1* | 6/2006 | Ro et al. | 370/208 |
| 2006/0203711 | A1* | 9/2006 | Oh et al. | 370/208 |
| 2007/0230324 | A1* | 10/2007 | Li et al. | 370/204 |
| 2009/0060081 | A1* | 3/2009 | Zhang et al. | 375/267 |

FOREIGN PATENT DOCUMENTS

| JP | 2005-519567 | 6/2005 |
| JP | 2005-322998 | 11/2005 |
| JP | 2006-510315 | 3/2006 |
| WO | WO 2007/013561 | 2/2007 |

OTHER PUBLICATIONS 7.1.1.2 Multiplexing Including Reference-Signal Structure, 3$^{rd}$ Generation Partnership Project, Technical Specification Group Radio Access Network: Physical Layer Aspects for Evolved UTRA (Release 7), (Feb. 2006), 3GPP TR 25.814 V1.2.0.
OFDM-Segment Configuration for the Synchronous Modulation, Association of Radio Industries and Businesses, (Jul. 2003), Transmission System for Digital Terrestrial Television Broadcasting. ARIB std-B31 Version 1.5.

(Continued)

*Primary Examiner* — Kenneth Lam
(74) *Attorney, Agent, or Firm* — Antonelli, Terry, Stout & Kraus, LLP.

(57) ABSTRACT

Freedom for relationship between division of a signal processing unit and a pilot signal is improved in a multi-carrier communication system such as OFDM. An encoded signal is divided into resource blocks and the signals are arranged independently of the arrangement of a pilot signal. The signal arranged at the same position as the pilot signal causes a puncture upon transmission.

5 Claims, 8 Drawing Sheets

OTHER PUBLICATIONS

Physical Channels and Multiplexing in Evolved UTRA Downlink, NTT DoCoMo, 3GPP TSG RAN WG1 Ad Hoc on LTE (Jun. 20-21, 2005) pp. 1-24, R1-050590.

Downlink Resource Allocation and Multiplexing, Samsung, 3GPP TSG-RAN WG1 Meeting #43, (Nov. 7-11, 2005), TDOC R1-051348.

* cited by examiner

ENCODED SIGNAL ARRANGEMENT METHOD IN MULTI-CARRIER COMMUNICATION AND COMMUNICATION DEVICE

INCORPORATION BY REFERENCE

The present application claims priority from Japanese application JP 2006-150876 filed on May 31, 2006, the content of which is hereby incorporated by reference into this application.

TECHNICAL FIELD

In a communication system for conducting communications by dividing an encoded signal into a plurality of communication resources, particularly a multi-carrier communication system that divides an encoded signal into a plurality of sub-carriers and conducts communication, such as an orthogonal frequency division multiplexing system, this invention relates to a signal arrangement method of encoded information and a communication device for materializing the method.

BACKGROUND ART

Multi-carrier communication systems for conducting communication by dividing transmission information into a plurality of frequency bands hereinafter called "sub-carriers" have been employed with the progress of wide band wireless communication technology. Among the multi-carrier communication systems, an OFDM (Orthogonal Frequency Division Multiplexing) system can eliminate the necessity for a guard band between sub-carriers by using a plurality of frequencies having an orthogonal relationship within a symbol time range while improving resistance to a delay wave by narrowing a bandwidth per sub-carrier and can keep frequency utilization efficiency. Therefore, the OFDM system has been employed in various kinds of systems as typified by digital television broadcasting e.g. ISDB-T (Integrated Services Digital Broadcasting-Terrestrial) and wireless LAN such as IEEE802.11a.

In these communication systems, a pilot signal having a fixed pattern is inserted into a transmission signal and synchronous detection is made at the time of reception by using the pilot signal as reference phase and reference amplitude. As for the insertion interval, the pilot signal must be inserted in an interval sufficiently faster (shorter) than a time-wise fluctuation speed of a propagation route in a time direction and detection must be made upon reception by updating the reference phase. As for a frequency direction, on the other hand, the OFDM system executes collectively a reception signal processing for those signals which are received through a plurality of propagation channels having mutually different delay times. Since the reception signal phase is different depending on the frequency of the signal, pilot signals that operate as reference signals with a frequency interval sufficiently smaller than the differences of the reception signal amplitude and phase resulting from the frequency must be inserted.

The degree of fluctuation of the amplitude and the phase in the frequency direction is greater with greater dispersion of the delay time of the delay wave. Therefore, those systems which assume an outdoor use insert the pilot signals into a greater number of sub-carriers such as digital television broadcasting than in those systems which assume an indoor use such as wireless LAN. When the pilot signals are inserted into a large number of sub-carriers in this way, a configuration in which the pilot signals are arranged in symbols, called "scattered pilot symbols", selected discretely in both time and frequency directions are ordinarily employed to avoid excessive dropping of data transmission efficiency.

Figure 2:
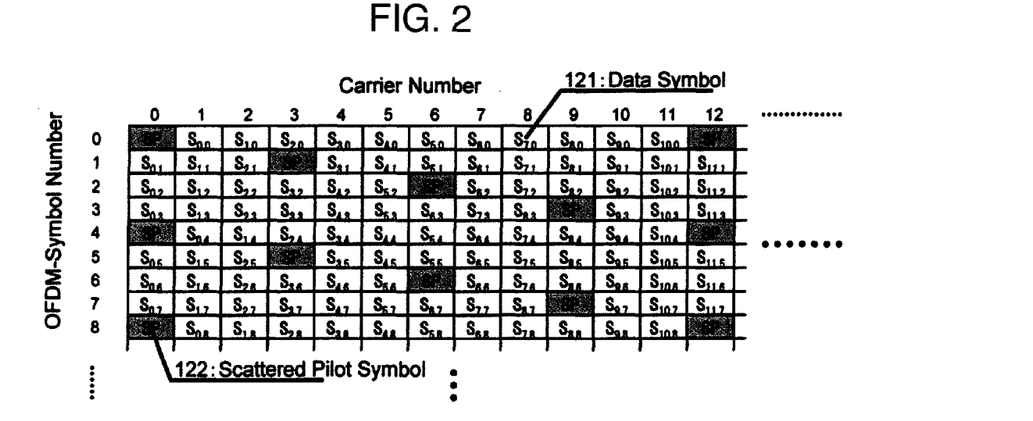
FIG. 2 shows an example of the arrangement of data symbols and scattered pilot symbols on a time-frequency axes of SDB-T.

FIG. 2 shows an example of the arrangement of the data symbols and the scattered pilot symbols on the time-frequency axis for ISDB-T that is described in Association of Radio Industries and Businesses, "Transmission System for Digital Terrestrial Television Broadcasting", ARIB std-B31 version 1.5, July 2003, 3.12.2, OFDM-segment Configuration for the Synchronous Modulation (non-patent document 1).

FIG. 2 is a schematic view in which the abscissa represents the carrier number, that is, the frequency axis, and the ordinate does the OFDM symbol number or the time axis. Each box of a rectangular shape represents one modulation symbol such as QPSK and 16QAM. Numeral 121 in the drawing denotes the data symbol used for the communication of information and SP denoted by reference numeral 122 represents the pilot symbol used as the reference signal. To secure resolution in both time and frequency directions with a smaller number of pilot symbols, the pilot symbols 122 are arranged discretely on the time and frequency axes. From this arrangement, the pilot symbols are called "scattered pilot symbols". Suffixes Si, j, etc, put to the data symbols 121 represent the data symbol that is ith in the frequency direction and jth in the time direction. The number in the frequency direction is the symbol number other than the scattered pilot symbols as shown in FIG. 2. Therefore, the number of data symbols arranged at a certain time is the balance obtained by subtracting the number of pilot sub-carriers from the total number of sub-carriers.

In the field of mobile communication, on the other hand, communications are made in one wireless band by multiplexing signals from a plurality of users having different requirements for communication quality, communication speed, etc, and a plurality of channels. As means for multiplexing and mapping in this case, a system has been examined which gathers one or a plurality of sub-carriers or one of a plurality of time symbols into one resource block, divides a channel and allocates the divided channels to the resource blocks.

For example, $3^{rd}$ Generation Partnership Project, "Technical Specification Group Radio Access Network: Physical Layer Aspects for Evolved UTRA (Release 7)", 3GPP TR 25.814 V1.2.0, February 2006, 7.1.1.2 Multiplexing including Reference—Signal Structure (non-patent document 2) describes a method that handles about 25 sub-carriers in the frequency direction and about 6 to about 7 symbols in the time direction as one resource block.

DISCLOSURE OF THE INVENTION

Problems to be Solved by the Invention

When the scattered pilot symbols such as ISDB-T shown in FIG. 2 are used and data allocation in the resource block unit described in the non-patent document 2 is used in combination, the insertion position of the pilot symbol and the insertion number of the pilot symbols become different unless the structure of the resource block and the structure of the pilot symbol arrangement are synchronized with each other. Therefore, the problems develop in that when the data is mapped to the resource block, the number of data to be mapped must be changed in accordance with the number of the pilot symbols inserted into the resource blocks and that both modulation processing at the time of transmission and demodulation processing at the time of reception get more complicated because the inserting positions of the pilot symbols are different depending on each resource block.

The invention is completed to solve the problems described above and is directed to provide an encoded signal arrangement method in multi-carrier communication capable of easily executing signal arrangement to resource blocks and a demodulation processing even when the structure of the resource block is different from the structure of a pilot symbol arrangement, and a communication device employing the signal arrangement method.

Means for Solving the Problem

As means for solving the problems described above in a signal arrangement method according to the invention, a transmitter and a receiver conduct communications by using a plurality of carriers, a pilot signal used as a reference signal of demodulation is transmitted by using a part of time and frequency, a signal is divided into a resource block unit containing one or a plurality of carriers or one or a plurality of time symbols, an encoded signal encoded by using an error correction code is communicated, the same number of information bits are allocated to each of the resource blocks, each of the information is arranged to time/frequency and the signal arranged at the same position as the pilot signal is punctured and transmitted.

Effect of the Invention

The invention makes it possible to conduct mapping of transmission information to the time and frequency axis independently of the arrangement of a pilot symbol on the time and frequency axis and to provide a signal arrangement method capable of arranging signals with a simple construction and a high degree of freedom and a communication device using this method.

Other objects, features and advantages of the invention will become more apparent from the description of embodiments thereof taken in connection with the accompanying drawings.

BEST MODE FOR CARRYING OUT THE INVENTION

Embodiments of the invention will be hereinafter explained with reference to the accompanying drawings. The following explanation will explain the case where the signal arrangement method of the invention is applied to signals transmitted from a first wireless station to a second wireless station. In this case, the first wireless station will be called a "transmission station" with the second, a "reception station". On the other hand, the signal arrangement method of the invention can be applied to both of signal transmission from the first wireless station to the second and signal transmission from the second wireless station to the first. In this case, the first and second wireless stations execute signal processing of both transmission station and reception station that will be hereinafter explained.

In a system in which a base station or an access point hereinafter called a "fixed station" and user terminals hereinafter called "mobile stations" exist in a cellular system or a wireless LAN of an infrastructure mode, for example, the fixed station corresponds to the transmission station of the invention and the mobile station, to the reception station of the invention when the invention is applied to the communication from the fixed station to the mobile station. When the invention is applied to the communication from the mobile station to the fixed station, conversely, the mobile station corresponds to the transmission station of the invention and the fixed station, to the reception station. When the invention is applied to both of the communication from the fixed station to the mobile station and the communication from the mobile station to the fixed station, each of the fixed station and the mobile station executes both signal processing as the transmission station and the reception station.

In a system in which the terminals directly make communications with each other as in the case of wireless LAN of an ad hoc mode, each terminal operates as the transmission station of the invention when the signal is transmitted in accordance with the invention and as the reception station when the signal is received in accordance with the invention.

An embodiment of the invention will be explained about an OFDM system which arranges each sub-carrier in a symbol unit to an orthogonal frequency as a multi-carrier communication system by way of example. However, the invention is in no way limited to the OFDM system but can be applied to those multi-carrier systems which use a plurality of sub-carriers.

Figure 3:
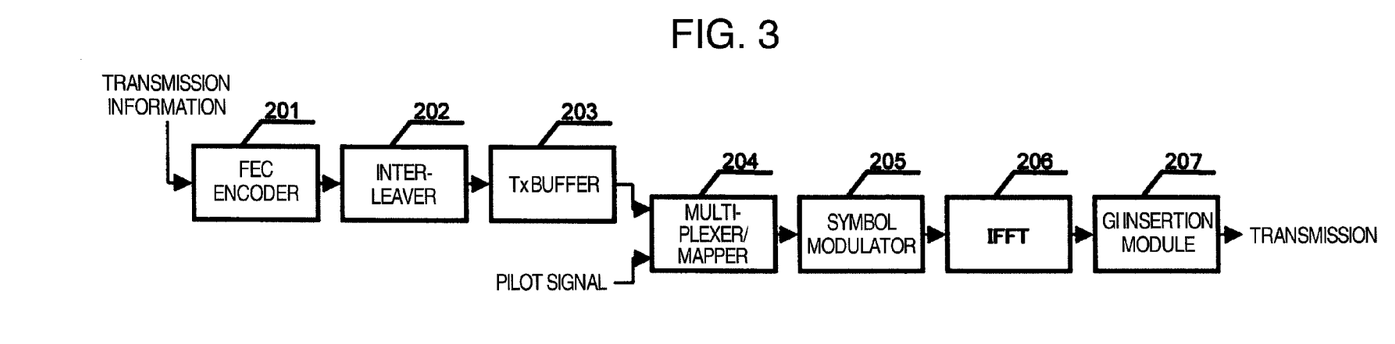
FIG. 3 shows an example of the construction and the flow of signal processing of a transmission station according to the invention.

FIG. 3 shows an example of a construction of a broadcasting station and the flow of signals in an embodiment of the invention. After an error detection code such as CRC is first added in an FEC (Forward Error Correction) encoder 201, transmission information is encoded by using the error correction code such as a convolutional code, a turbo code or an LDPC code. An interleave processing for changing the order of signals is executed for the encoded signals in an interleaver 202 and the signals are built up in a Tx buffer 203. The signals built up in the Tx buffer 203 are taken out in the quantity to be transmitted in a unit time and are inputted with pilot signals into a multiplexer/mapper unit 204.

In the multiplexer/mapper 204, the pilot signal and the signal taken out from the Tx buffer are mapped in such a fashion as to correspond to sub-carriers for transmission and a symbol time for a plurality of channels in the case of communication using a plurality of channels and for a plurality of users in the case of communication of a plurality of users. A symbol modulator 205 of the next stage executes a modulation processing by a symbol modulation system such as QPSK, 8PSK or 16QAM and the signals are inputted to an IFFT 206. The IFFT 206 transforms signals of a frequency domain in which the symbol is defined for each sub-carrier to signals of a time domain by an inverse Fourier transform processing and the signals are then sent to a GI (guard interval) insertion module 207. The GI insertion module 207 executes a guard interval insertion processing that copies a part of the tail of the signal outputted from the IFFT 206 and inserts it. The signal eventually outputted is transmitted through a wireless zone.

Figure 5:
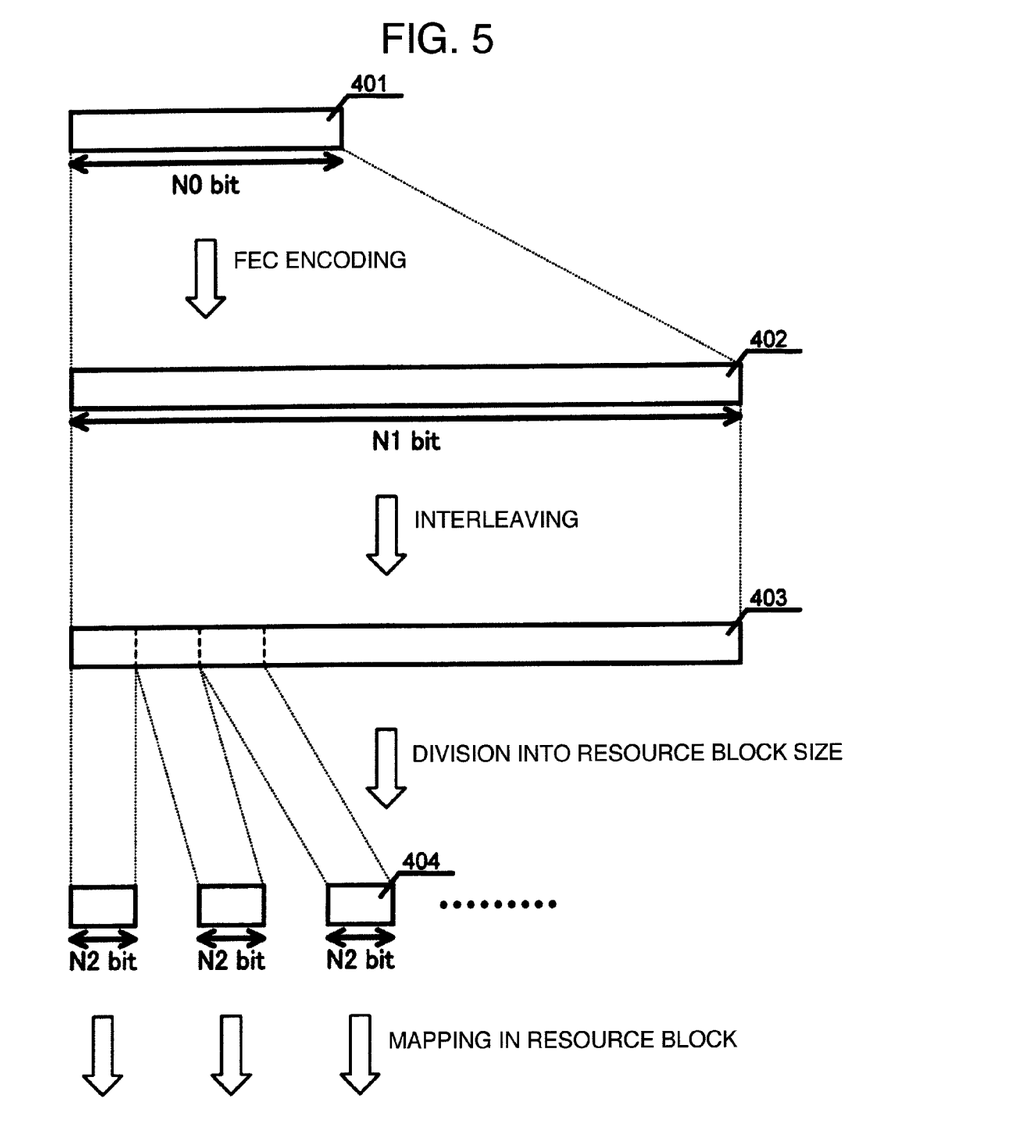
FIG. 5 is a schematic view of signal division in the transmission station according to the invention.

FIG. 5 is a schematic view of processed signals in the portion ranging from the FEC encoder 201 to the multiplexer/mapper 204 in the construction of the transmission station and in the flow of the signals shown in FIG. 3. The transmission information is taken out by N0 bits for a code unit 401. The transmission information is added with the error correction code such as CRC and is further error-correction coded by using an error correction code such as a convolutional code, turbo code or LDPC code to result in a signal of N1-bit length (signal block after encoding) 402 in the FEC encoder 201 shown in FIG. 3. The order of the signal 402 is rearranged in the interleaver 202 shown in FIG. 3 and the signal is built up as the signal of the same N1-bit length before interleaving (signal block after interleaving) 403 in the Tx buffer 203 shown in FIG. 3. From the signal 403, one or a plurality of signals 404 is selected and is inputted into the multiplexer/ mapper 204 show in FIG. 3. The signal 404 represents signal blocks of length N2-bits so divided as to correspond to the resource block size. Here, the N2-bit is the product obtained by multiplying the modulation symbol number per resource block by the number of bits that can be communicated per modulation symbol. When 100 modulation symbols exist per resource block and QPSK is used as the modulation system, for example, the N2-bit is 200 bits when QPSK is used for the modulation system and the N2-bit is 600 bits when 64QAM is used for the modulation system.

Figure 4:
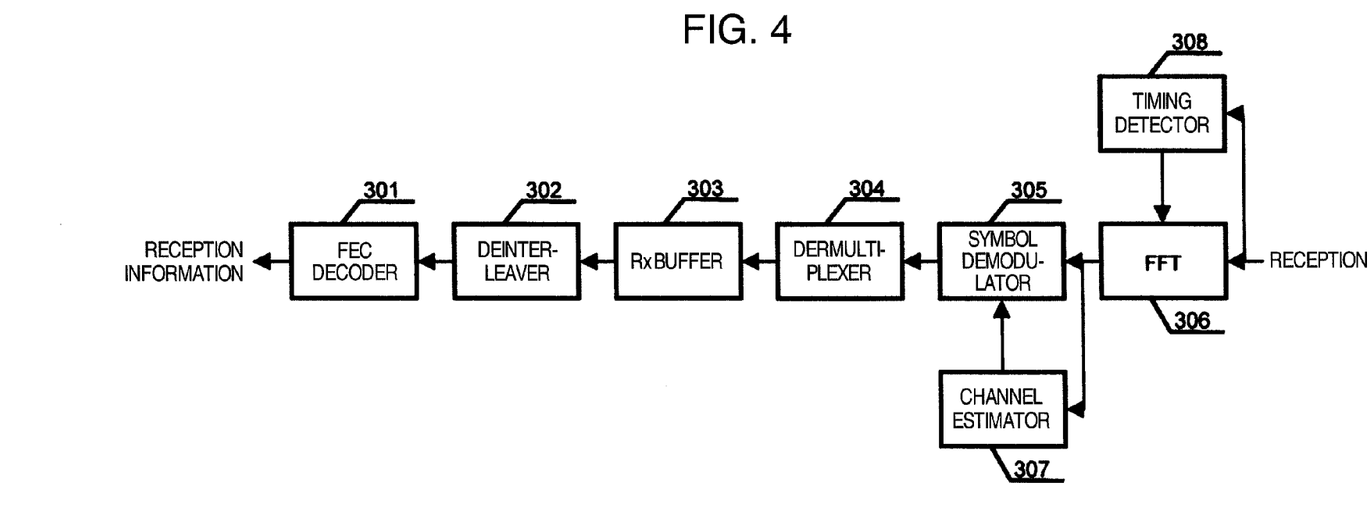
FIG. 4 shows an example of the construction and the flow of signal processing of a reception station according to the invention.

On the other hand, FIG. 4 shows an example of a construction of a reception station and the flow of signals in the embodiment of the invention. The signal received by the reception station is first inputted to a timing detector 308 and a reception timing is judged by a peak position detection processing of a mutual correlation value of a fixed pattern signal and the reception signal and a auto-correlation processing of the reception signal itself. The reception timing is reported to an FFT 306. The FFT 306 executes a Fourier transform processing for the reception signal in match with the reception timing reported from the timing detector 308 and transforms the reception signal of the time series to the signal of the frequency domain.

The signal transformed to the signal of the frequency domain by the FFT 306 is first inputted to a channel estimator 307. The channel estimator 307 compares the phase and amplitude of the pilot signal contained in the signal with the phase and amplitude of the pilot signal transmitted by the transmission station, estimates the fluctuation quantities of the phase and amplitude per sub-carrier and per time from the comparison result and reports the estimation result to a symbol demodulator 305.

The symbol demodulator 305 compensates for the fluctuation in the propagation channel for the signal transformed to the frequency domain in the FFT 306 by using the fluctuation quantity of the phase and amplitude estimated in the channel estimator 307, demodulates the signal subjected to symbol demodulation such as QPSK and 16QAM and inputs this signal to a demultiplexer 304. The demultiplexer 304 extracts the user conducting demodulation and the signal of the channel and builds them in an Rx buffer 303.

When the signals are built up in the unit quantity of modulation processing, the Rx buffer 303 sends the signals to a deinterleaver 302. The deinterleaver 302 rearranges the order of signals opposite to the interleave processing in the transmission station and inputs the signals to a FEC decoder 301. The FEC decoder 301 executes the decoding processing by using the error correction code used at the time of transmission and also executes the output processing for outputting the signal along with the existence/absence information of the error judged by using the error detection code added at the time of transmission, as reception information.

Figure 1:
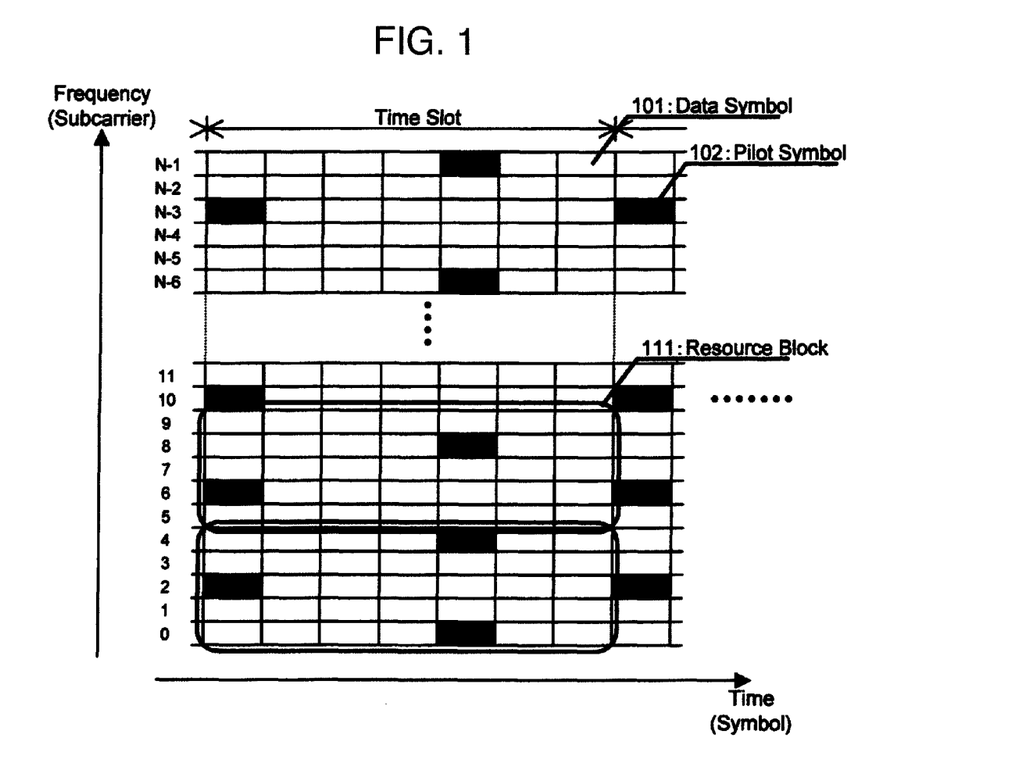
FIG. 1 shows an example of the arrangement of data and pilot symbols and resource blocks.

FIG. 1 is a schematic view showing the arrangement of the data symbols and the pilot symbols on the time axis and on the frequency axis in the embodiment of the invention and the arrangement of the resource block. The term "resource block" means a unit processing quantity which collectively handles, as one unit, one or a plurality of symbols that extend over a plurality of sub-carriers and a plurality of unit time and which is used as a mapping unit when mapping code words to data symbols. By virtue of making the mapping unit as the resource block unit, instead of making it as the unit of individual modulation symbol, it becomes possible to simplify "signaling" that reports how a certain code word is mapped and eventually simplify the mapping processing itself, although the freedom of degree of mapping is somewhat decreased. In the drawing, the ordinate represents the sub-carrier number, that is, the frequency axis, and the abscissa represents the symbol number, that is, the time axis. Rectangular boxes in the drawing represent the modulation symbols such as QPSK and 16QAM and white (hollow) boxes denoted by reference numeral 101 represent the data symbol. Smeared (solid) boxes denoted by reference numeral 102 represent a pilot symbol and a unit consisting of a plurality of modulation symbols and encircled by a frame denoted by reference numeral 111 represents a resource block.

Incidentally, in FIG. 1, 5 sub-carriers in the frequency direction and 7 symbols in the time direction are gathered into one resource block and are handled but these values are a mere example and the number of sub-carriers and the number of symbols per resource block are not limited to these values.

Figure 6:
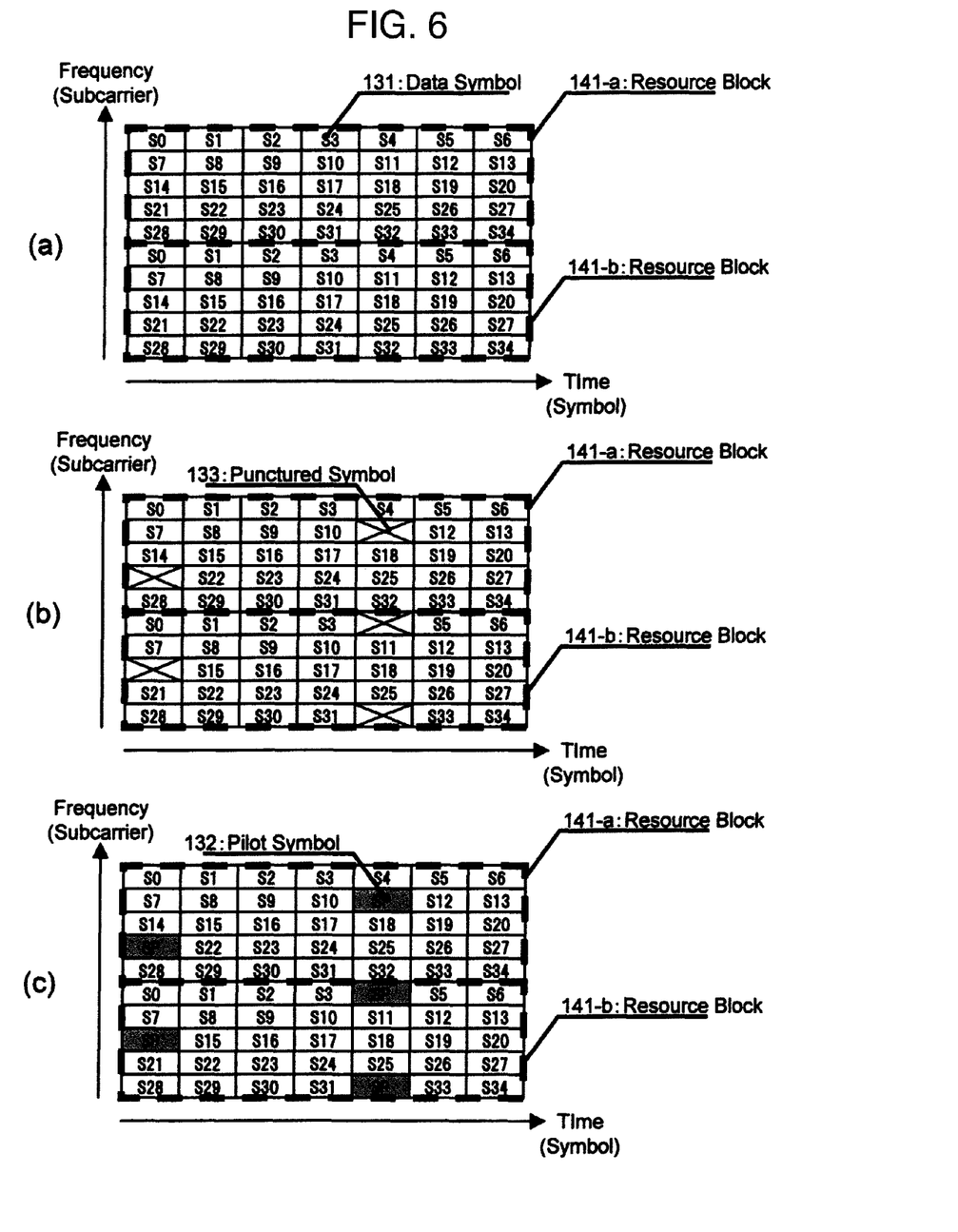
FIG. 6 shows an example of signal allocation to resource blocks according to the invention.

FIG. 6 is a schematic view showing an example of the mode of allocation of the data and pilot symbols to the resource blocks in the multiplexer/mapper 204 of the transmission station in the invention shown in FIG. 3.

Explanation will be given by limiting the resource blocks to two blocks, i.e. resource blocks 141-*a* and 141-*b*, to simplify the explanation. Both resource blocks have a size of 5 sub-carriers in the frequency direction and 7 symbols in the time direction or a size capable of communicating 35 modulation symbols in total. Symbols S0 to S34 in the drawing each represent one modulation symbol. When BPSK is used as the modulation system, for example, the symbol means 1-bit information per 1 modulation symbol, 2-bit information when QPSK is used, 3-bit information when 8PSK is used, 4-bit information when 16QAM is used and 6-bit information when 64QAM is used.

In the example shown in FIG. 6, 35 symbols having the same size and the same quantity as the resource block are first allocated to the resource blocks 141-*a* and 141-*b* and 35 symbols of S0 to S34 are mapped to the time/frequency inside the resource blocks 141-*a* and 141-*b* in the same form. Reference numeral 131 denotes the data symbol.

Next, the data symbol mapped to the same time/frequency as the time/frequency of the pilot symbol, that is, S11 and S21 in the resource block 141-*a* and S4, S14 and S32 in the resource block 141-*b*, are punctured as shown in (b). Reference numeral 133 denotes the punctured data symbol.

Finally, the pilot symbol 132 is mapped in place of the punctured data symbol as shown at (c) in the Figure and allocation of the data and the pilot symbols to the resource blocks in the example shown in FIG. 6 is completed.

The allocation method of the data and the pilot symbols to the resource blocks shown in FIG. 6 is used in the symbol demodulator 305 and the channel estimator 307 in the reception station shown in FIG. 4, too.

In this case, the channel estimator 307 extracts the inserted pilot symbol 132 as shown at (c) in the Figure, compares the phase and amplitude of this signal with the phase and amplitude of the pilot signal transmitted, and estimates the fluctuation quantities of the phase and amplitude per sub-carrier and per time.

In the symbol demodulator 305 of the reception station, when the symbol demodulation processing is executed, the data symbols that are mapped to the same time/frequency as the time/frequency of the pilot symbols shown at (b) in the Figure and punctured, that is, S11 and S21 in the resource block 141-*a* and S4, S14 and S32 in the resource block 141-*b* are not subjected to demodulation and the demodulation result of likelihood 0 is outputted by regarding that a signal having signal power 0 is received.

Figure 7:
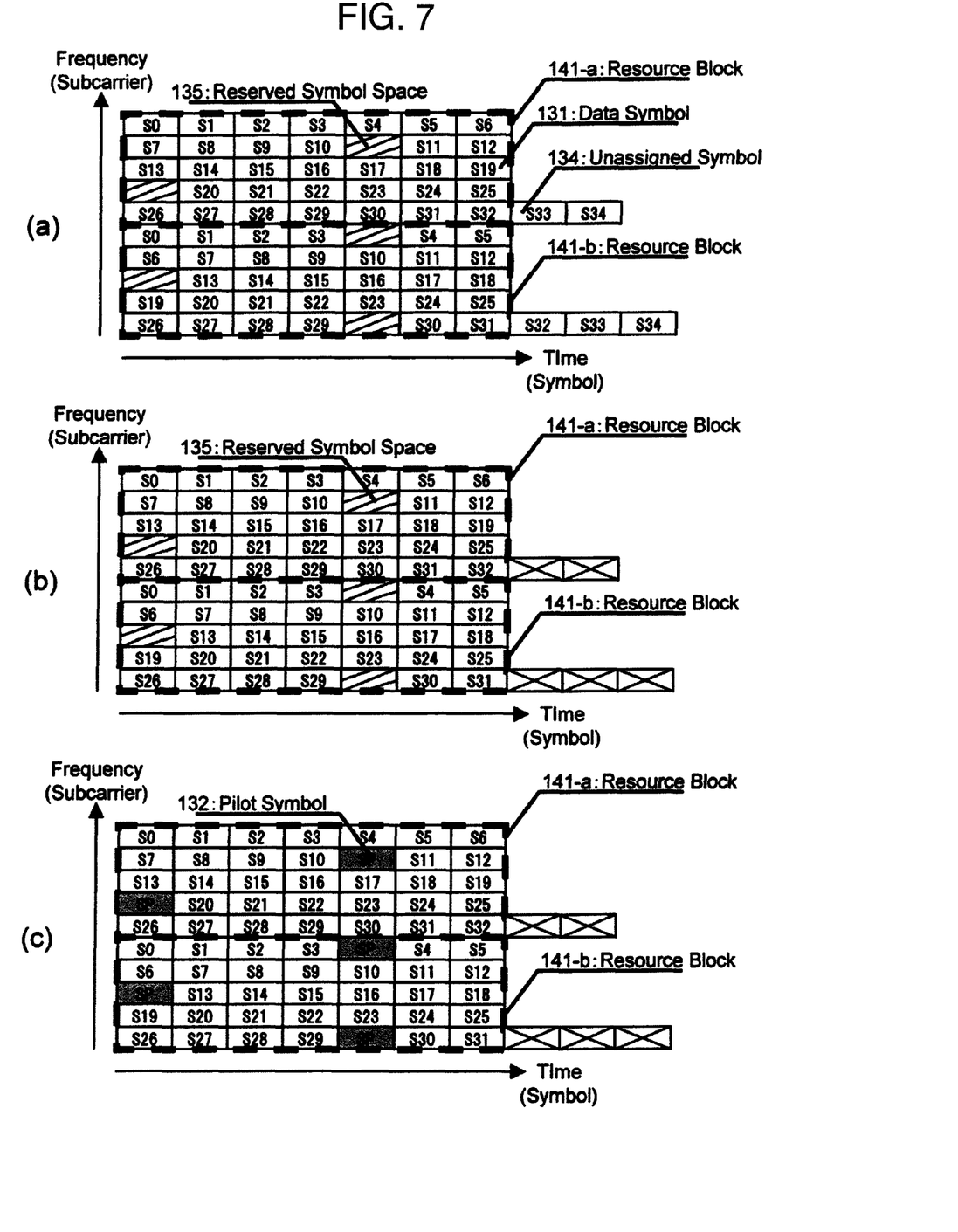
FIG. 7 shows an example of signal allocation to resource blocks according to the invention.

FIG. 7 is a schematic view showing another example of the mode of allocation of the data and the pilot symbols to the resource blocks in the multiplexer/mapper 204 of the transmission station in the invention shown in FIG. 3. In FIG. 7, explanation will be given by limiting the resource blocks to two resource blocks, i.e. resource blocks 141-*a* and 141-*b*, to simplify the explanation. Both resource blocks have a size of 5 sub-carriers in the frequency direction and 7 symbols in the time direction or a size capable of communicating 35 modulation symbols in total. Symbols S0 to S34 in the drawing each represent one modulation symbol. When BPSK is used as the modulation system, for example, the symbol means 1-bit information per 1 modulation symbol, 2-bit information when QPSK is used, 3-bit information when 8PSK is used, 4-bit information when 16QAM is used and 6-bit information when 64QAM is used.

In the example shown in FIG. 7, 35 symbols having the same size and the same quantity as the resource block are first allocated to the resource blocks 141-*a* and 141-*b*. In the resource block 141-*a*, 33 symbols S0 to S32 are mapped to the time/frequency inside the resource blocks 141-*a* and in the resource block 141-*b*, 32 symbols of S0 to S31 are mapped to the time/frequency inside the resource block with the exception of the positions of a reserved symbol space 135 which is the time/frequency to which the pilot symbol is arranged as shown in (a). At this time, the symbols 134 to which the transmission time/frequency corresponding to 2 symbols of S33 and S34 in the resource block 141-*a* and 3 symbols of S32 to S34 in the resource block 141-*b* are not assigned is as such discarded without being transmitted.

Next, the data symbols not mapped to the time/frequency as the time/frequency of the pilot symbol, that is, S33 and S34 in the resource block 141-*a* and S32 to S34 in the resource block 141-*b*, among those allocated to the resource blocks as shown at (b) in the Figure are punctured.

Finally, the pilot symbol 132 is mapped to the position of the reserved symbol space 135 to which the data is not mapped, as shown at (c) in the Figure, and allocation of the data and the pilot symbol to the resource blocks in the example shown in FIG. 7 is completed.

The allocation method of the data and the pilot symbol to the resource blocks shown in FIG. 7 is used in the symbol demodulator 305 and the channel estimator 307 in the reception station shown in FIG. 4, too.

In this case, the channel estimator 307 extracts the inserted pilot symbol 132 as shown at (c) in the Figure, compares the phase and amplitude of this signal with the phase and amplitude of the pilot signal transmitted, and estimates the fluctuation quantities of the phase and amplitude per sub-carrier and per time.

In the symbol demodulator 305 of the reception station, the demodulation result of likelihood 0 is added and outputted by regarding that a signal of signal power 0 is received for 2 symbols of S33 and S34 in the resource block 141-*a* and for 3 symbols of S32 to S34 in the resource block 141-*b* that are discarded without transmission at (a) in the Figure when the demodulation processing of the symbol is executed.

Figure 8:
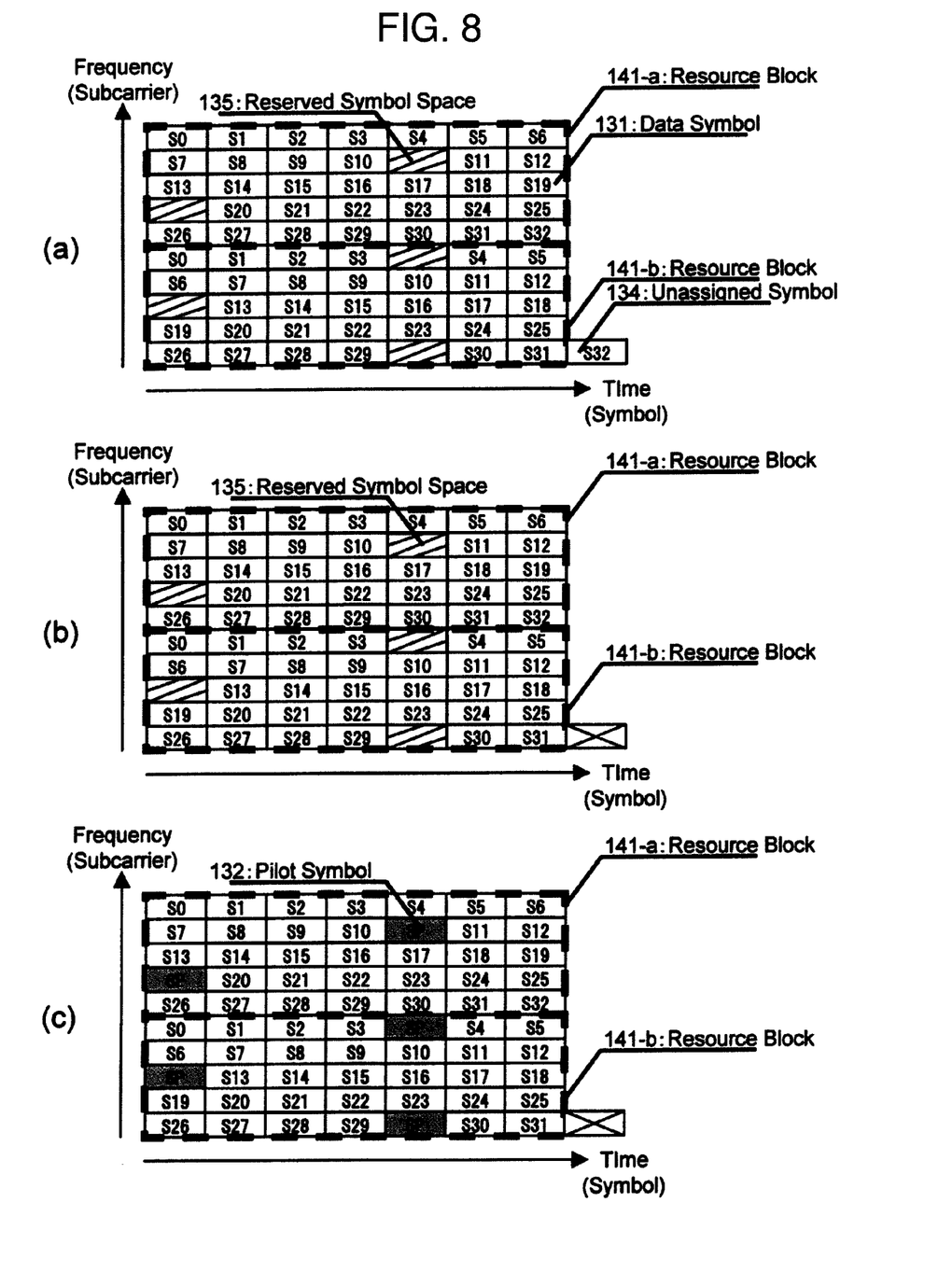
FIG. 8 shows an example of signal allocation to resource blocks according to the invention.

FIG. 8 is a schematic view showing still another example of the mode of allocation of the data and the pilot symbol to the resource blocks in the multiplexer/mapper 204 of the transmission station in the invention shown in FIG. 3. In FIG. 8, explanation will be given by limiting the resource blocks to two resource blocks, i.e. resource blocks 141-*a* and 141-*b*, to simplify the explanation. Both resource blocks each have a size of 5 sub-carriers in the frequency direction and 7 symbols in the time direction or a size capable of communicating 35 modulation symbols in total. Symbols S0 to S34 in the drawing each represent one modulation symbol. When BPSK is used as the modulation system, for example, the symbol means 1-bit information per 1 modulation symbol, 2-bit information when QPSK is used, 3-bit information when 8PSK is used, 4-bit information when 16QAM is used and 6-bit information when 64QAM is used.

In the example shown in FIG. 8, data corresponding to the number of symbols, which is the difference of a number of symbols corresponding to the size of the resource block and the minimum value of the number of pilot symbols allocated inside the resource blocks, is first allocated to each resource block. In the case of FIG. 8, the size of the resource block is 35 symbols, the number of pilot symbols allocated into the resource block 141-*a* is 2 and the number of pilot symbols allocated into the resource block 141-*b* is 3. Therefore, the data of the balance acquired by subtracting 2 from 35, that is, 33 symbols, is allocated to each resource block. In the resource block 141-*a*, 33 symbols of S0 to S32 are mapped to the time/frequency inside the resource blocks 141-*a* and in the resource block 141-*b*, 32 symbols of S0 to S31 are mapped to the time/frequency inside the resource block with the exception of the time/frequency position 135 to which the pilot symbol is arranged as shown at (a) in the Figure. At this time, the symbol 134 to which the transmission time/frequency corresponding to one symbol of S32 in the resource block 141-*b* is not assigned is as such discarded without being transmitted.

Next, the data symbol not mapped to the time/frequency, that is, S33 in the resource block 141-*b* among those allocated to the resource blocks shown at (b) in the Figure is punctured.

Finally, the pilot symbol 132 is mapped to the position 135 to which the data is not mapped, as shown at (c) in the Figure, thereby completing allocation of the data and the pilot symbol to the resource blocks in the example shown in FIG. 8.

The allocation method of the data and the pilot symbol to the resource blocks shown in FIG. 8 is used in the symbol demodulator 305 and the channel estimator 307 in the reception station shown in FIG. 4, too.

In this case, the channel estimator 307 of the reception station extracts the inserted pilot symbol 132 which has been inserted as shown at (c) in the Figure, compares the phase and amplitude of this signal with the phase and amplitude of the pilot signal transmitted, and estimates the fluctuation quantities of the phase and amplitude per sub-carrier and per time.

In the symbol demodulator 305 of the reception station, the demodulation result of likelihood 0 is added and outputted by regarding that a signal of signal power 0 is received for one symbol of S32 in the resource block 141-*b* discarded without transmission at (a) in the Figure when the demodulation processing of the symbol is executed.

Figure 9:
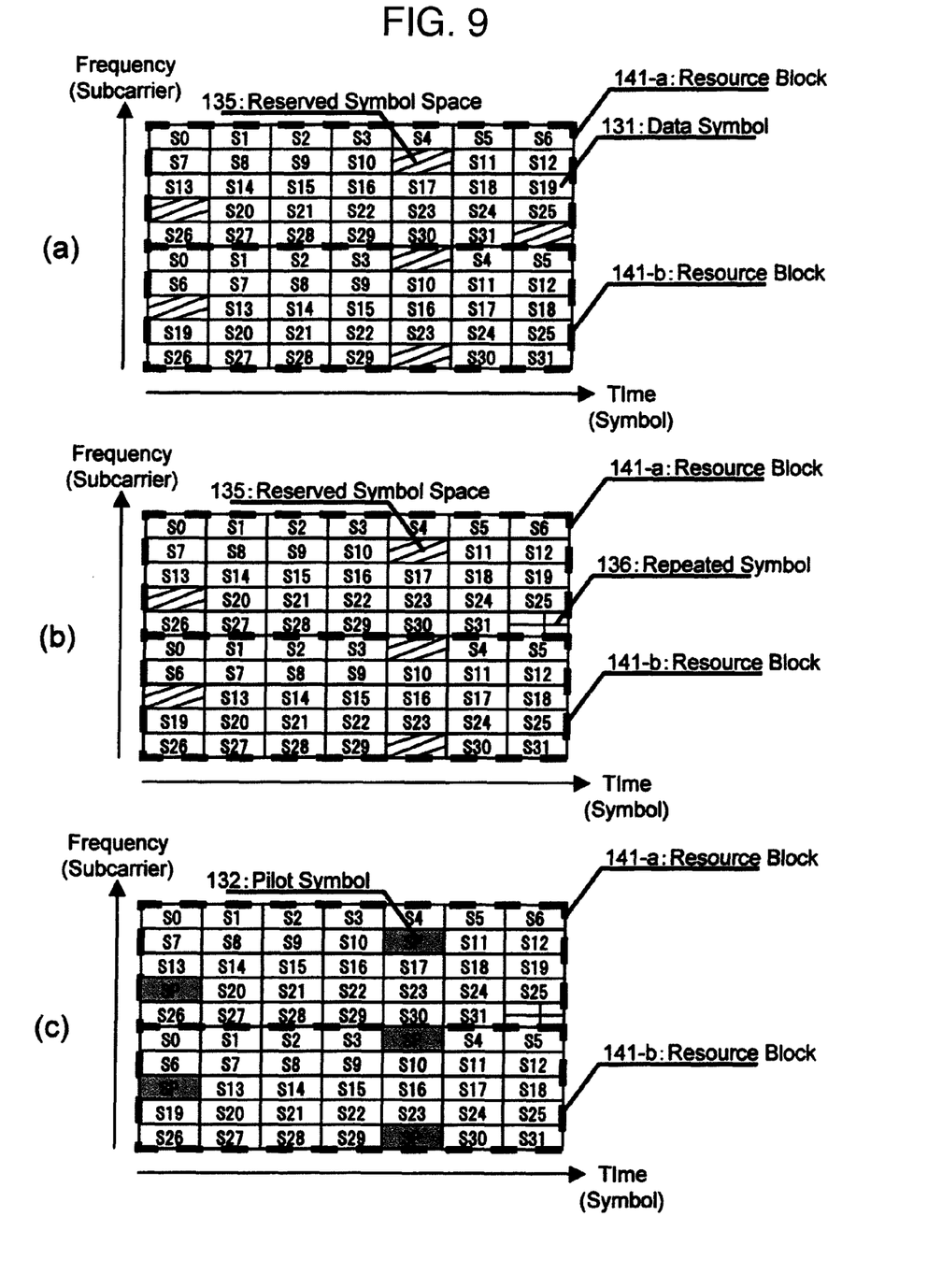
FIG. 9 shows an example of signal allocation to resource blocks according to the invention.
Figure 10:
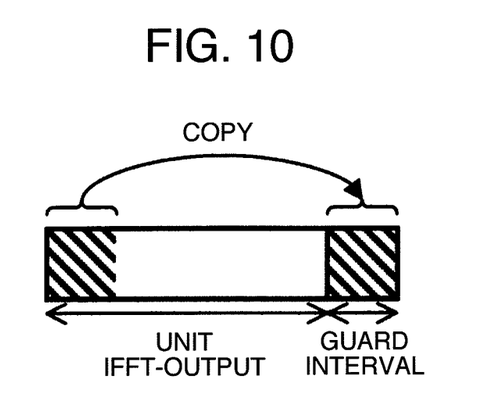
FIG. 10 is a schematic view showing a guard interval insertion processing.

FIG. 9 is a schematic view showing still another example of the mode of allocation of the data and the pilot symbol to the resource blocks in the multiplexer/mapper 204 of the transmission station in the invention shown in FIG. 3. In FIG. 9, explanation will be given by limiting the resource blocks to two resource blocks, i.e. resource blocks 141-*a* and 141-*b*, to simplify the explanation. Both resource blocks each have a size of 5 sub-carriers in the frequency direction and 7 symbols in the time direction or a size capable of communicating 35 modulation symbols in total. Symbols S0 to S34 in the drawing each represent one modulation symbol. When BPSK is used as the modulation system, for example, the symbol means 1-bit information per 1 modulation symbol, 2-bit information when QPSK is used, 3-bit information when 8PSK is used, 4-bit information when 16QAM is used and 6-bit information when 64QAM is used.

In the example shown in FIG. 9, data corresponding to the number of symbols, which is the difference of a number of symbols corresponding to the size of the resource block and the maximum value of the number of pilot symbols allocated inside the resource blocks is first allocated to each resource block. In the case of FIG. 8, the size of the resource block is 35 symbols, the number of pilot symbols allocated into the resource block 141-a is 2 and the number of pilot symbols allocated into the resource block 141-b is 3. Therefore, the data as the balance acquired by subtracting 3 from 35, that is, 32 symbols, is allocated to each resource block. In the resource blocks, 32 symbols of S0 to S31 are mapped to the time/frequency inside the resource block with the exception of the time/frequency position denoted by reference numeral 135 to which the pilot symbol is arranged as shown at (a) in the Figure.

Next, any of the signals already allocated to the time/frequency is selected and allocation is repeated to the time/frequency 136 to which no symbol to be allocated exists, as shown at (b) in the Figure.

Finally, the pilot symbol 132 is mapped to the position 135 to which the data has not been mapped, as shown at (c) in the Figure, thereby completing the allocation of the data and the pilot symbol to the resource blocks in the example shown in FIG. 9.

The allocation method of the data and the pilot symbol to the resource blocks shown in FIG. 9 is used in the symbol demodulator 305 and the channel estimator 307 in the reception station shown in FIG. 4, too.

In this case, the channel estimator 307 of the reception station extracts the inserted pilot symbol 132 as shown at (c) in the Figure, compares the phase and amplitude of this signal with the phase and amplitude of the pilot signal transmitted, and estimates the fluctuation quantities of the phase and amplitude per sub-carrier and per time.

In the symbol demodulator 305 of the reception station, the demodulation result of likelihood is synthesized for the signal allocated by repletion at (b) in the Figure when the demodulation processing of the symbol is executed, and is outputted as the demodulation result of the signal selected for the purpose of repetition.

Although the invention has been described in its some preferred forms, it is to be understood that the invention is not limited to the specific embodiments and various changes and modifications could be made thereto by those skilled in the art without departing from the spirit and scope of the invention.

The invention claimed is:

1. An information transmission method in a multi-carrier wireless communication system in which a transmitter and a receiver conduct communication by using one or plural resource blocks containing plural modulation symbols said one or plural resource blocks correspond to one or plural frequency carriers and one or plural time symbols, comprising:
   an operation in which a pilot signal is transmitted by using a part of said plural modulation symbols in said resource blocks,
   an operation in which transmission information is encoded by using an error correction code, and
   an operation in which said encoded information is mapped and allocated to said modulation symbols,
   wherein a number of modulation symbols in each resource block in which said encoded information is mapped is independent to a number of modulation symbols in resource blocks used to transmit said pilot signals, and
   said encoded information mapped and allocated to modulation symbols at the same position as said pilot signal is transmitted, are punctured.

2. A communication station for a multi-carrier wireless communication system in which a transmitter and a receiver conduct communication by using one or plural resource blocks containing plural modulation symbols, said one or plural resource blocks correspond to one or plural frequency carriers and one or plural time symbols, comprising:
   a multiplexer/mapper unit which transmits a pilot signal by using a part of said plural modulation symbols in said resource blocks,
   an encoder unit which encodes transmission information by using an error correction code, and
   a multiplexer/mapper unit which maps and allocates said encoded information to said modulation symbols,
   wherein a number of modulation symbols in each resource block in which said encoded information is mapped is independent to a number of modulation symbols in resource blocks used to transmit said pilot signals, and
   said multiplexer/mapper unit punctures said encoded information mapped and allocated to modulation symbols, at the same position as said pilot signal is transmitted.

3. A communication station for multi-carrier wireless communication system, comprising:
   a multiplexer/mapper unit which maps data symbols to resource elements with criteria that resource elements containing pilot signals is used for mapping and allocating data symbols according to the mapping,
   and punctures data symbols which is mapped and allocated to resource elements containing pilot signals; and
   a transmitter unit which transmits the data symbols other than punctured data symbols and the pilot signals.

4. A information transmitting method in a first station for transmitting to a second station in a multi-carrier wireless communication system using a resource blocks containing plural modulation symbols, said resource block corresponds to one or plural frequency carriers and one or plural time symbols, the information transmitting method comprising:
   mapping and allocating a first modulation symbol related to data in the resource block;
   mapping a second modulation symbol related to a pilot signal in the resource block;
   puncturing the first modulation symbol to which has been mapped the second modulation symbol;

allocating the second modulation symbol in the resource block; and transmitting said pilot signal and said data other than data corresponding to the punctured modulation symbol.

5. A multi-carrier wireless communication system comprising:

a first communication station which includes:

a multiplexer/mapper unit which maps data symbols to resource elements with criteria that resource elements containing pilot signals is used for mapping and allocating data symbols according to mapping, and which punctures data symbols which are mapped and allocated to resource elements containing pilot signals, and a transmitter unit which transmits the data symbols other than punctured data symbols and the pilot signals, and a second communication station which includes:

a receiver which receives the data symbols other than punctured data symbols and the pilot signals, a channel estimator which determines a channel condition on the basis of the received pilot signals, and a symbol demodulator which outputs a demodulation result of likelihood 0 related to a symbol related to the punctured data symbol.

* * * * *